United States Patent [19]
Hayes

[11] Patent Number: 5,955,033
[45] Date of Patent: Sep. 21, 1999

[54] ROTARY KILN ARRANGEMENTS

[75] Inventor: Michael Richard Hayes, Preston, United Kingdom

[73] Assignee: British Nuclear Fuels Limited, Warrington, United Kingdom

[21] Appl. No.: 08/445,451

[22] Filed: Sep. 15, 1993

Related U.S. Application Data

[63] Continuation of application No. 07/863,330, Apr. 2, 1992, abandoned, which is a continuation of application No. 07/639,384, Jan. 11, 1991, abandoned, which is a continuation of application No. 07/535,987, Jun. 8, 1990, abandoned, which is a continuation of application No. 07/248,278, Sep. 21, 1988, abandoned, which is a continuation of application No. 06/892,747, Aug. 4, 1986, abandoned, which is a continuation of application No. 06/694,474, Jan. 23, 1985, abandoned, which is a continuation of application No. 06/405,079, Aug. 4, 1982, abandoned.

[30] Foreign Application Priority Data

Aug. 12, 1981 [GB] United Kingdom ................... 8124666

[51] Int. Cl.⁶ ..................................................... B01J 10/00
[52] U.S. Cl. .......................... 422/109; 422/199; 422/209; 423/261
[58] Field of Search ..................................... 422/109, 199, 422/209; 423/261

[56] References Cited

U.S. PATENT DOCUMENTS

| | | | |
|---|---|---|---|
| 572,258 | 12/1896 | Hogan | 422/209 X |
| 1,230,343 | 6/1917 | Tommasi | 422/209 |
| 2,785,213 | 3/1957 | Bludworth | 422/199 X |
| 2,886,418 | 5/1959 | Altimier et al. | 422/209 |
| 3,111,394 | 11/1963 | Weber et al. | 422/209 X |
| 3,594,544 | 7/1971 | Wonderlich | 422/199 X |
| 4,236,219 | 11/1980 | Killebrew, Jr. et al. | 422/109 X |
| 4,272,823 | 6/1981 | Pool | 422/109 X |

FOREIGN PATENT DOCUMENTS

| | | |
|---|---|---|
| 512667 | 1/1981 | France . |
| 864851 | 4/1961 | United Kingdom . |
| 921654 | 3/1963 | United Kingdom . |

OTHER PUBLICATIONS

Chemical Engineers Handbook; R.W. Perry and C.H. Chilton, Eds.; 5th Edition, 1973, McGraw–Hill Book Co pp. 20–36, 20–37 and frontise page.

*Primary Examiner*—Jill Warden
*Attorney, Agent, or Firm*—William H. Holt; William R. Hinds

[57] ABSTRACT

A rotary kiln in which reaction is to occur between counterflowing reactants and an injector for a reactant extends into a reaction zone in the kiln. The injector is provided with means for adjusting the temperature of the injected reactant to a temperature in the desired range for that zone. Further means are provided for maintaining a temperature in the desired range throughout the zone. The arrangement be used in the production of uranium oxides from uranium hexafluoride.

5 Claims, 3 Drawing Sheets

ROTARY KILN ARRANGEMENTS

This is a continuation of application Ser. No. 07/863,330 filed Apr. 2, 1992, abandoned which is a continuation of Ser. No. 07/639,384 filed Jan. 11, 1991, abandoned, which is a continuation of Ser. No. 07/535,987 filed Jun. 8, 1990, abandoned, which is a continuation of Ser. No. 07/248,278 filed Sep. 21, 1988, abandoned, which is a continuation of Ser. No. 06/892,747 filed Aug. 4, 1986, abandoned, which is a continuation of Ser. No. 06/694,474 filed Jan. 23, 1985, abandoned, which is a continuation of Ser. No. 06/405,079 filed Aug. 4, 1982, abandoned.

BACKGROUND OF THE INVENTION

This invention relates to kiln arrangements. The invention has particular, although not exclusive, applications in relation to the manufacture of uranium dioxide.

A problem that can arise in such manufacture is that, if the kiln arrangement is too hot, the physical properties of the uranium dioxide manufactured can be defective insofar as they do not allow for satisfactory handling in subsequent processes. On the other hand, if the kiln arrangement is too cold, the uranium dioxide can have too high a fluorine content.

SUMMARY OF THE INVENTION

According to the present invention a rotary kiln arrangement, in which a reaction is to occur between counterflowing reactants, and an injector for at least one reactant extends into a reaction zone of the kiln arrangement, is provided with means for maintaining the temperature throughout that zone within a desired range and said means includes means for adjusting the temperature of the injected reactant to a temperature within the desired range while it is in the injector.

Preferably, the injector comprises an elongate tube which contains at least one longitudinally disposed electrical heater. Advantageously, the electrical heater has elements which are adjustable to control the temperature of the injected reactant.

Conveniently the kiln arrangement includes a temperature sensing array (which may be disposed in generally parallel relationship to the injector) to provide a signal whereby the temperature of the injected reactant is controlled.

DESCRIPTION OF THE DRAWINGS

An embodiment of the present invention will now be described by way of example only with reference to the accompanying drawings in which.

DESCRIPTION OF PREFERRED EMBODIMENT

Figure 1:
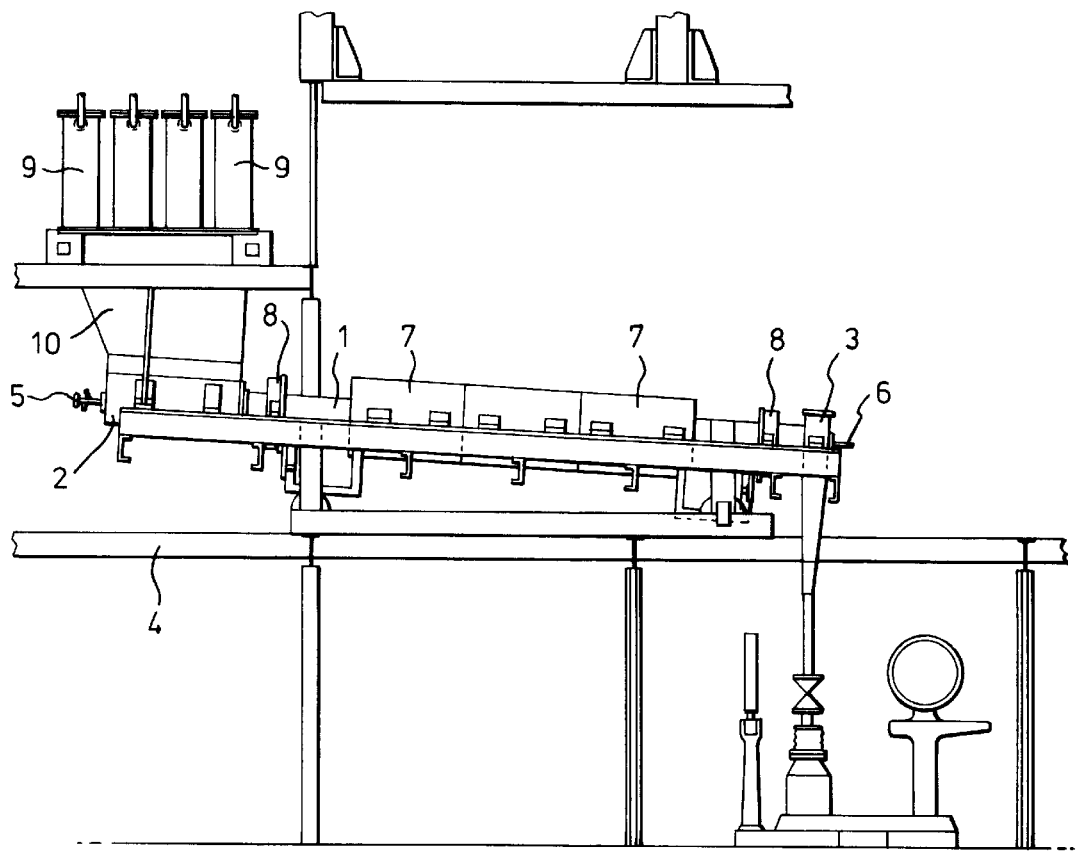
FIG. 1 is a general elevation.

Reference is directed first to FIG. 1 in which a rotary kiln is shown on a supporting framework 4. The kiln has an inclined barrel 1, and an inlet chamber 2 with an associated disentrainment section 10. The inlet chamber connects with the upper end of the barrel 1 and is provided with an inlet jet 5 for gaseous reactants. At the lower end of the barrel 1 is a discharge hopper 3 through which extends another reactant inlet 6. A further reactant inlet (not shown) is also provided. The kiln barrel has electrical heater units 7 disposed around its periphery. Three such heater units are shown around its periphery in the Figure. Bearings 8, not shown in detail in FIG. 1, allow for rotation of the kiln and also for longitudinal thermal expansion thereof. Filters 9 are provided above the disentrainment section 10.

Figure 2:
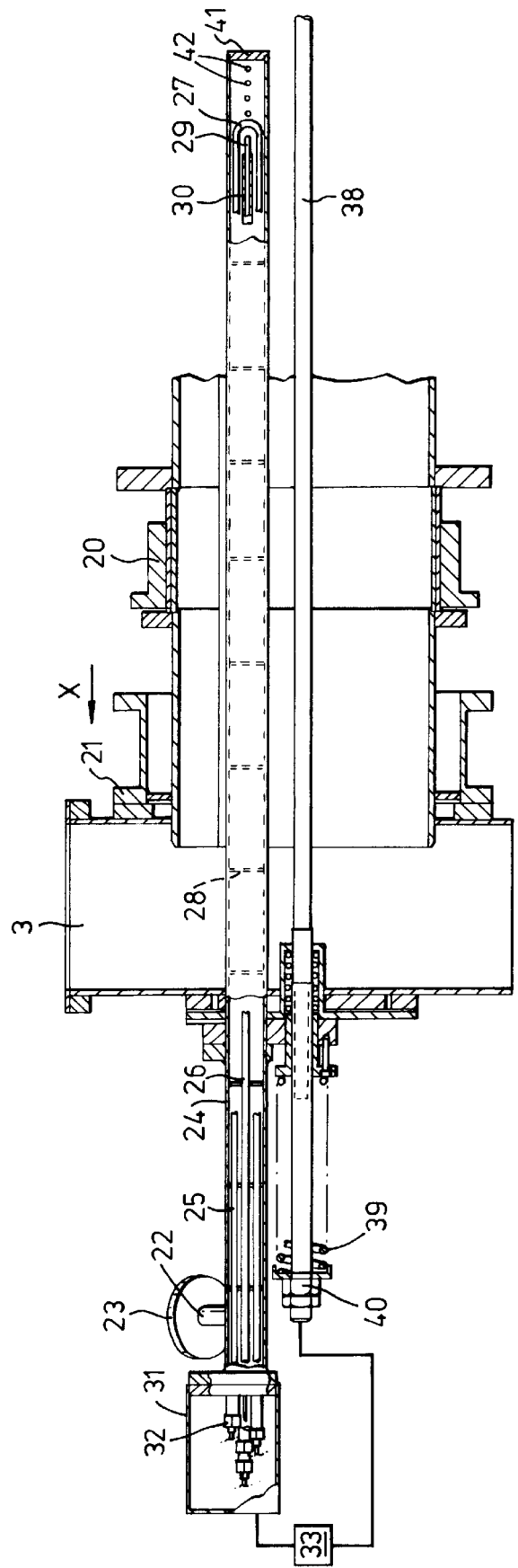
FIG. 2 is an incomplete vertical section looking out of the paper as compared to FIG. 1 and including a part which is schematic.

Reference is now directed to FIG. 2, which shows in more detail that part of FIG. 1 about the discharge hopper 3. Part of bearing 8 attached to this end of the kiln is indicated by 20, and a seal between the kiln and the discharge hopper 3 by 21. The seal 21 is such that relative movement between the discharge hopper 3 and the kiln is allowed without leakage, as would occur during thermal expansion. The direction of such movement of the kiln 1 is indicated by X in the Figure.

A steam inlet pipe 22 is supplied with steam via a connecting flange 23. The pipe 22 feeds into a heater tube 24 which contains electrical heating elements 25 and 26. These elements are generally U-shaped, a curved part being seen in connection with heating element 25 at 27, and are supported along the length of the heater tube by spacer grids 28. Also contained within the heater tube 24 and likewise held by the grids is a thermocouple 29 which is sleeved by a protective sleeve 30. Electrical connections for the electrical heaters and thermocouple are provided in a connector box 31, connections for the heaters being seen at 32. Control wires for the electrical heaters 25 and 26 may be operated from a control box 33, whereto may also be fed the output signal from the thermocouple 29. A further thermocouple for use in the kiln is generally indicated by 38. The thermocouple 38 is held in position by a spring bias provided by a spring 39 and a locknut arrangement 40. The tube 24 is sealed in the kiln by a cap 41. Steam emerges from the tube 24 through holes 42.

Figure 3:
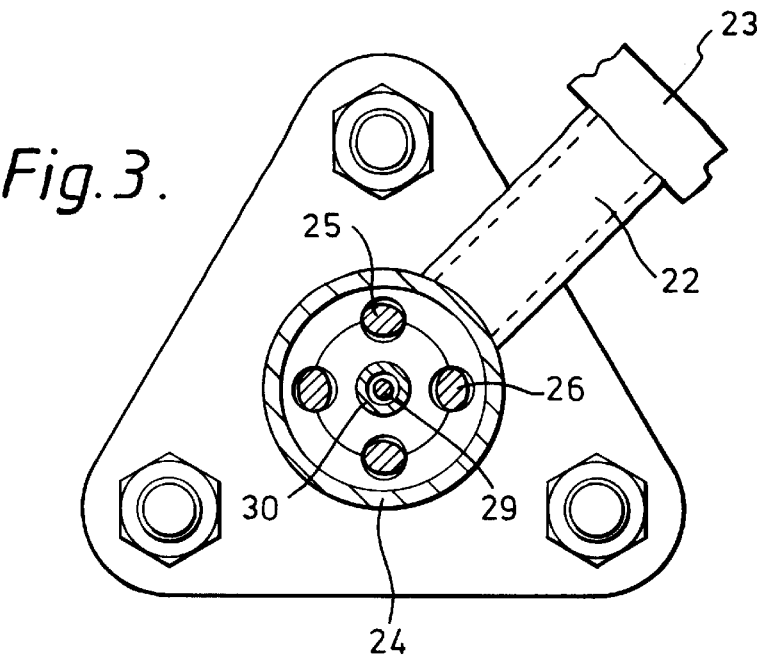
FIG. 3 is a section on of FIG. 2 on a different scale.

The configuration on the heater elements 25 and 26 can be more clearly seen in FIG. 3 in which like references to FIG. 2 are used for like parts.

Figure 4:
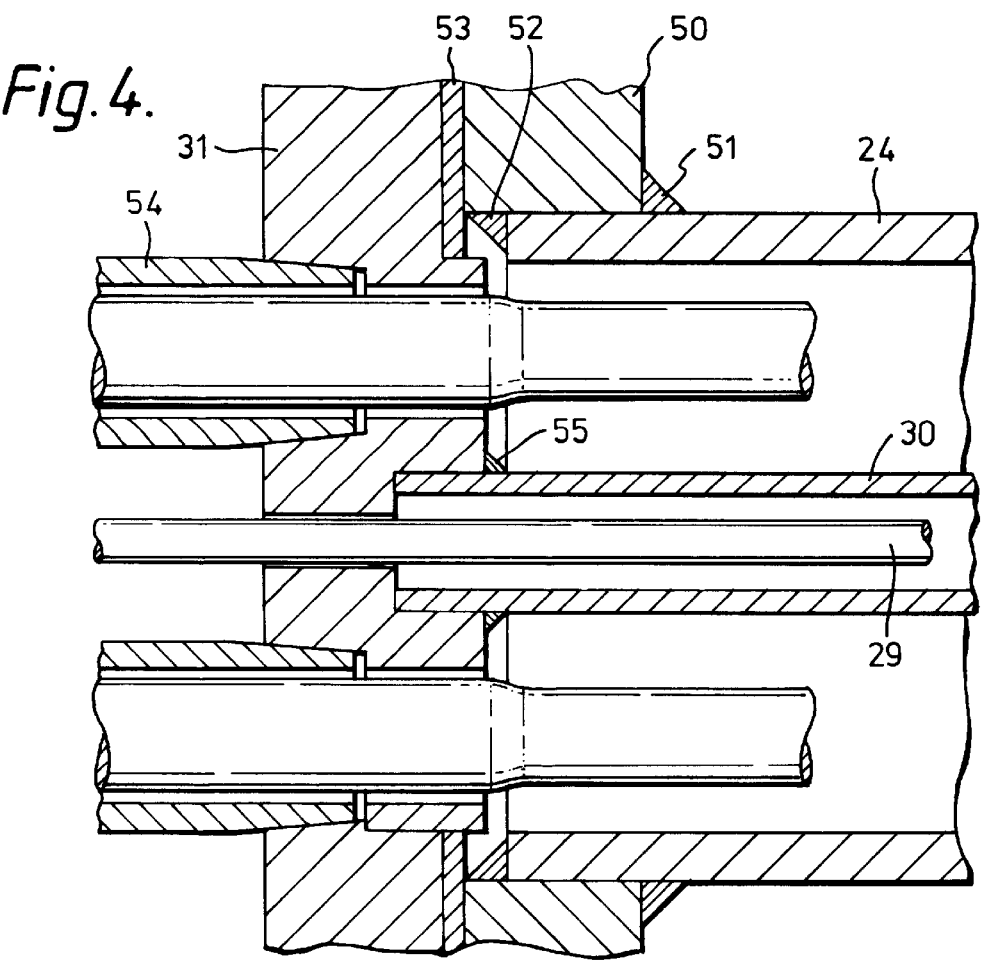
FIG. 4 is an incomplete section of components shown in FIG. 2.

Referring now to FIG. 4, in which like reference numerals to preceding Figures are used for like parts, there is shown in some detail the joint between the heater tube 24 and the electrical connector box 31. The heater tube 24 is welded to a plate 50 by two welds indicated by 51 and 52. The plate 50 is secured to part of the connector box 31 by means such as bolts (not shown). A gasket 53 is disposed between the plates 50 and box 31 to ensure that the joint is gastight. Sheaths for the heater elements 25 and 26 are indicated by 54. The sheaths 54 are affixed to the box 31. The thermocouple protective sleeve 30 is welded to the box 31 by means of welds 55. The thermocouple 29 does not itself contact the box 31.

Operation of the kiln arrangement is now described with reference to all of the Figures. Uranium hexafluoride and dry steam are injected into the kiln by means of the inlet jet 5. The uranium hexafluoride and dry steam issuing together from the nozzle of the jet react together in the form of a plume which is directed towards the upper end of the kiln barrel 1. Typically the steam temperature is 150° C., the uranium hexafluoride temperature 90° C. and, because the reaction between them is exothermic, the temperature in the plume reaches 500–600° C. The uranyl fluoride which is produced by the reaction is deposited in the upper end of the kiln barrel 1 which is rotated in use. In passing down the barrel 1 of the kiln the uranyl fluoride is reacted at a higher temperature (600–750° Celsius) with a steam/hydrogen mixture to produce uranium oxide powder. The required temperature is maintained in the kiln by the heater units 7. The use of a series of heater units enables the establishment of a required temperature gradient along the length of the kiln barrel 1. Steam is fed into the lower end of the kiln barrel 1 through the inlet 6 (described in more detail above with reference to FIG. 2 and also below)and hydrogen is passed through an inlet into the discharge hopper 3.

Lifting flights (not shown) in the kiln barrel 1 tumble the uranyl fluoride powder and cause it to move in a generally downwards path in countercurrent flow to the steam/hydrogen mixture passing upwards through the kiln barrel. Lifting and tumbling motion of the uranyl fluoride powder ensures efficient solids/gas contacting and rapid and efficient conversion of the uranyl fluoride powder into uranium oxide powder. The uranium oxide produced falls into the discharge hopper 3 and is discharged for further processing.

The temperature of steam entering the kiln barrel 1 through the inlet 6 may be controlled by operation of the heater elements 25 and 26, in response to signals from the thermocouples 29 and 38, with or without help from the control unit 33. The object of the control is to limit the radial distribution of heat to a minimum, that is 15–20° Celsius, between the centre of the kiln barrel and the periphery. If steam is allowed to enter the kiln barrel at too low a temperature the input from the heater units 7 has to be increased to compensate if too high a fluorine concentration is to be avoided in the uranium oxide product and a large radial distribution of heat results. The effect is a temperature at the periphery of the kiln barrel, which is so high that desirable physical properties of the uranium oxide product may be impaired. The temperature of the steam as it is injected into the kiln barrel is therefore matched to that which is preferred for the reaction occurring in the region of the kiln barrel about the inlet 6 and the heater units 7 are likewise controlled.

The mechanical structure of the heater tube 24 is such that it does not foul any other component in the kiln when thermal expansion of itself or the kiln takes place. Nonetheless, a gas-tight seal is always provided between components in the kiln. The heater tube 24 does not itself rotate as it is secured to the discharge hopper 3. It is also constructed so as not to foul any rotating components of the kiln. With the construction of electrical connector box shown no access is provided for steam to enter within the box 31. This is because all access points are sealed as by the sheaths 54 for the heater elements 25, 26 and the weld 55 between the thermocouple sleeve 30 and the box 31. Steam cannot escape from between the box 31 and plate 50 because of the gasket 53 which blocks this possible escape route.

I claim:

1. A rotary kiln, said kiln (1) including a reaction zone, an injector (24) extending into said reaction zone, first heating means (7) surrounding at least a portion of said kiln for controlling a temperature gradient therein; first temperature sensing means (38) extending inside said kiln to said reaction zone for controlling said first heating means (7); second heating means (25,26) located within said injector (24) for heating reactant material while said material passes along inside said injector (24); second temperature sensing means (29) located within said injector (24) for controlling said second heating means (25, 26); and control means 33 connected to said first temperature sensing means (38) and said second temperature sensing means (29) for controlling the temperature of said second heating means (25, 26) in relation to the temperature sensed by said first temperature sensing means (36) for minimizing the radial differential of heat at said reaction zone.

2. A rotary kiln as defined in claim 1 wherein said injector (24) comprises an elongate tube, and said second heating means comprises electrical heater means disposed within said elongate tube.

3. A rotary kiln as defined in claim 1 wherein said control means (33) maintains the radial distribution of heat for providing a differential of less than 20 degrees Celsius between a center of said rotary kiln and a periphery thereof.

4. Apparatus for manufacturing uranium dioxide, said apparatus comprising an inclined rotary kiln (1) having an upper end, a lower end and a reaction zone therebetween for receiving counterflowing first and second reactants; first heating means (7) surrounding and heating a part of said rotary kiln to produce a temperature gradient therealong within said kiln; first temperature sensing means (38) extending inside said kiln to said reaction zone for controlling said first heating means; supply means connected with a source of uranium hexafluoride and dry steam and with said kiln for introducing said uranium hexafluoride and dry steam into said kiln at said upper end thereof for producing uranyl fluoride therefrom; injecting means for injecting steam and hydrogen into said kiln at said lower end thereof to react with the uranyl fluoride for producing uranium oxide powder; said injecting means including an injector (24) for steam extending into said reaction zone; second heating means (25, 26) located in said injector for variably heating steam passing within said injector and from said injector into said kiln for assisting said first heating means to control the radial temperature gradient in said reaction zone; second temperature sensing means (29) located within said injector for controlling said second heating means; said first temperature sensing means being located within said kiln radially between said injector and the kiln wall; and control means (33) responsive to said first temperature sensing means and said second temperature sensing means for controlling the temperature of said second heating means and the temperature of steam from said injector in relation to the temperature sensed by said first temperature sensing means for minimizing the radial temperature gradient at said reaction zone.

5. Apparatus as defined in claim 4 wherein said control means produces a temperature gradient less than 20 degrees Celsius.

* * * * *